(12) United States Patent
Weintritt et al.

(10) Patent No.: US 7,666,469 B2
(45) Date of Patent: Feb. 23, 2010

(54) METHOD OF MAKING GRAPHITE-COATED PARTICULATE MATERIALS

(75) Inventors: Donald J. Weintritt, Lafayette, LA (US); Peter Zaleski, Poulsbo, WA (US); Henry Francois, Oak Park, IL (US); Frank A. Wawrzos, McHenry, IL (US)

(73) Assignee: Superior Graphite Co., Chicago, IL (US)

( * ) Notice: Subject to any disclaimer, the term of this patent is extended or adjusted under 35 U.S.C. 154(b) by 0 days.

(21) Appl. No.: 12/143,118

(22) Filed: Jun. 20, 2008

(65) Prior Publication Data

US 2008/0248308 A1 Oct. 9, 2008

Related U.S. Application Data

(63) Continuation of application No. 11/361,766, filed on Feb. 24, 2006, now Pat. No. 7,402,338.

(60) Provisional application No. 60/656,254, filed on Feb. 25, 2005.

(51) Int. Cl.
*B05D 7/00* (2006.01)

(52) U.S. Cl. .................. 427/189; 427/196; 427/214; 427/215; 427/216; 427/220; 427/222

(58) Field of Classification Search .............. 427/189, 427/196, 215, 214, 216, 220, 221, 222; 508/109, 508/113, 115, 131; 428/403, 407
See application file for complete search history.

(56) References Cited

U.S. PATENT DOCUMENTS

| | | | | |
|---|---|---|---|---|
| 2,581,301 A | * | 1/1952 | Saywell | 508/105 |
| 3,821,111 A | * | 6/1974 | Abe et al. | 508/123 |
| 3,844,954 A | * | 10/1974 | Filippov et al. | 508/105 |
| 4,939,191 A | | 7/1990 | Kataoka et al. | |
| 5,445,748 A | * | 8/1995 | Holinski | 508/129 |
| 5,826,669 A | | 10/1998 | Zaleski et al. | |
| 5,839,520 A | | 11/1998 | Mailet | |
| 5,971,113 A | * | 10/1999 | Kesavan et al. | 188/251 A |
| 6,372,678 B1 | | 4/2002 | Youngman et al. | |
| 6,524,706 B1 | | 2/2003 | Manning et al. | |
| 6,528,157 B1 | | 3/2003 | Hussain et al. | |
| 6,568,918 B2 | * | 5/2003 | Sugioka et al. | 417/269 |
| 6,582,819 B2 | | 6/2003 | McDaniel et al. | |
| 6,734,147 B2 | | 5/2004 | Levy | |
| 6,780,804 B2 | * | 8/2004 | Webber et al. | 501/128 |
| 7,244,492 B2 | | 7/2007 | Sinclair et al. | |
| 7,402,338 B2 | * | 7/2008 | Weintritt et al. | 428/403 |
| 2008/0268247 A1 | * | 10/2008 | Kurihara et al. | 428/402 |

FOREIGN PATENT DOCUMENTS

WO WO 2004/092301 A2 10/2004

OTHER PUBLICATIONS

PCT Notification of Transmittal of the International Search Report, PCT/US2006/06460, International Filing Date Feb. 24, 2006.
PCT Written Opinion of the International Searching Authority, PCT/US2006/06460, International Filing Date Feb. 24, 2006.

* cited by examiner

*Primary Examiner*—H. (Holly) T Le
(74) *Attorney, Agent, or Firm*—Cook Alex Ltd.

(57) ABSTRACT

An coated particulate is provided with a graphite-impregnated resin coating. The oil field particulates may comprise any of gravel-pack sand, granular betonite, ground Gilsonite, calcium carbonate, glass beads, rock wool, shredded paper, metal spheres, ceramic beads, nut hulls, ground rubber, plastic beads, muscovite mica, calcined petroleum coke, and perlite. The resin may comprise as a binder one or more of a natural, synthetic, water-soluble, and organic resins. More specifically, the resins may comprise an organic film-forming resin such as an alkyd, polyurethane and epoxy. Alternatively, the resin may comprise a film-forming water-soluble polymer, such as a starch, carboxymethyl cellulose, hydroxyethyl cellulose, and xanthan gum. In a further alternative, the resin may comprise a resin-dispersed emulsion, such as a latex or acrylic.

18 Claims, No Drawings

METHOD OF MAKING GRAPHITE-COATED PARTICULATE MATERIALS

CROSS REFERENCE TO RELATED APPLICATION

This application is a continuation of U.S. application Ser. No. 11/361,766, filed Feb. 24, 2006 now U.S. Pat. No. 7,402, 338, which claims the benefit of U.S. provisional application Ser. No. 60/656,254, filed Feb. 25, 2005.

BACKGROUND OF THE INVENTION

The present invention relates to particulates having a graphite-impregnated coating and, more particularly, to particulates with a graphite-impregnated coating typically added to drilling, completion or well stimulation fluids, and the like.

In the technology of oil well drilling, completion, stimulation, lost circulation ("LC" or "LCM"), seepage and torque and drag reduction additives, there are a great variety of products that are in use. All of these can be functionally improved by reducing frictional effects when pumped downhole at a concentration greater than ~10 lb/bbl.

Examples of such materials are set forth in Table 1:

TABLE 1

| | | |
|---|---|---|
| Gravel pack sand | Granular betonite | Ground Gilsonite |
| Calcium carbonate | Glass beads | Rock wool |
| Shredded paper | Metal Spheres | Ceramic beads |
| Nut hulls | Ground rubber | Plastic beads |
| Muscovite mica | Calcined petroleum coke | Perlite |

Accordingly, it is an object of the present invention to provide various oil field particulates with an anti-friction coating.

SUMMARY OF THE INVENTION

This object, as well as others that will become apparent upon reference to the following detailed description, are achieved by providing an oil field particulate with a graphite-impregnated coating. The oil field particulates may comprise, but are not limited to, any of the particulates identified in Table 1. For the present purposes, the term "particulate" includes fibers and fibrous materials.

The coating may comprise a binder of one or more of a natural, synthetic, water-soluble, and organic resins. More specifically, the resins may comprise an organic film-forming resin such as an alkyd, polyurethane and epoxy. Alternatively, the binder may comprise a film-forming water-soluble polymer, such as a starch, carboxymethyl cellulose, hydroxyethyl cellulose, and xanthan gum. In a further alternative, the binder may comprise a resin-dispersed emulsion, such as a latex or acrylic. In a still further alternative, the binder may comprise a wax or paraffin.

In another aspect of the invention, the graphite may be a natural flake, natural amorphous, or synthetic graphite, with the graphite particles ranging in size from 0.001 micron to 850 microns. The size of the coated particulates may range in size from between 5 microns to 30,000 microns.

WRITTEN DESCRIPTION OF INVENTION

A graphite impregnated coating on any of the Table 1 materials provides all of the advantages normally accruing to graphite, namely, low friction, non-reactive, non-polluting, and electrically conductive. Various types of graphites may be utilized, such as natural flake, natural amorphous and synthetic graphites. However special methods must be used to form a durable coating. Foremost among the problems in forming a coating is that it is difficult to adhere graphite to surfaces due, in part, to the fact graphite does not have an electric charge and there is a weak bond between the platy crystals. In contrast, most minerals are, overall, electronegative, and some minerals have both electronegative and electropositive charges within the same particle. Consequently, it is essential that the coating comprise a binder, preferably a resin or polymer, that encapsulates the graphite and adheres to the substrate. Therefore it is an important part of the process to disperse graphite in a binder so that when cured (by, e.g., temperature, catalyst or evaporation of water and/or organic solvent), the graphite/binder mixture will adhere to the substrate to the extent and time required by the application. As will be shown, the binder can be a water soluble polymer, water-based emulsion or solvent-based hydrocarbon. Binders may include organic film-forming resins, such as alkyds, polyurethanes and epoxies; film-forming water-soluble polymers, such as starch, carboxymethycellulose (CMC), hydroxyethyl cellulose (HEC) and xanthan gum (XC polymers); resin-dispersed emulsions, such as latex and acrylics; or waxes and paraffins.

Spraying or comingling substrates with just enough binder and graphite works well for coating small particles. The preferred method is an appropriately sized mixer or blender where air or heat can accelerate the time to make a quality uniform coating. Two or three thin coatings give a better quality coating than can be normally obtained with one heavy coat.

In the case of particulates, and with specific reference to Example 3 herein, the procedure involves adding a known amount of Slip Plate No. 3, (a pre-mixed formulation of graphite and resin available from the Superior Graphite Co. of Chicago, Ill.), to a known weight of nut hulls (or other substrate), mixing until dry to the touch, and then adding more of the formulated graphite and binder. This routine is repeated until the desired amount of coating has been applied. The amount of graphite/binder is calculated from the increase in weight over the original.

The inverse procedure also works well, that is adding the nut hulls (or any other substrate) to a known amount of binder. As the resin permeates into the substrate and begins to polymerize, graphite is added. However, this method however adds another step, in that excess graphite that does not stay attached to the substrate must be removed.

The substrates identified in Table 1 can be coated with a variety of binders, and the coated particles can range in size from approximately +20 microns to −6.3 millimeters. The thickness of the coating may vary from approximately 3 mils (0.076 millimeters) to three times the diameter of the particle being coated. The weight percentage (wt. %) of the graphite relative to the substrate can vary from between less than 1 wt. % to 97 wt. %, and more preferably from about 5 wt % to 95 wt. %.

Ceramic beads can be coated with an epoxy resin containing 30 wt % graphite. Alternatively, ceramic beads can be coated with water soluble mixture of a high amylopectin starch and NaCMC dispersed in de-ionized water, in which the branched chain glucoside provides stronger adhesion to the bead than the more common amylase starch. The starch was followed by the addition of a small amounts of Na-CMC and gluteraldehyde as a biocide for storage stability.

CMC is anionic. The hydrated colloids will adsorb on any electropositive site regardless of their composition. This adds "toughness" to the dried binder thus keeping the graphite on the bead surface following removal of free water (e.g., be heating to 135° F.).

A material may be treated with less than 1 to about 50 wt. % graphite. The treatment may be a partial coating or it may be a graphite film up to about 15 mil (38.1 millimeters) thickness. In some applications it has been found useful to disperse graphite in a resin or polymer binder for extreme long term service in water or oil, or it can be formulated for temporary service wherein the binder containing graphite is dissolved in the fluid in which it is being transmitted downhole, thus freeing the graphite from the high performance particulate solid. In that case the graphite may be as much as 97 wt. %. However, the use of graphite treated particulate is not just a method for introducing graphite but is for also improving the performance of the base material with which it is associated.

Drill-in and Completion Fluid Additives

Current completion fluids technology often makes use of sized calcium carbonate particles to reduce fluid loss into the pay zone when high purity, high density brine, such as zinc/calcium bromide or cesium/potassium formate, is used to complete a well.

One problem with the use of calcium carbonate particles is the increase in pumping friction by virtue of the mass of particles colliding with each other as they are pumped with the brine into the wellbore. This problem has been recognized by oil companies as needing improvement. In any case, a significant increase in pumping efficiency is realized with the graphite coated particles, particularly in horizontally drilled wells several thousand feet long.

Coating the calcium carbonate reduces the coefficient of friction from about 0.3 to 0.08, and the graphite-coating of the calcium carbonate particles has no measurable effect on rheology over uncoated particles. Calcium carbonate is 100% soluble in 15% HCl mud acid. The calcium carbonate is sized to plug the throat of pores in the producing zone and may be used in a concentration of 10-25 lb/bbl or more. When the well is allowed to flow, the graphite-coated material will be forced out of the pores by produced oil coming into the production string. However, calcium carbonate with a temporary thin coating of graphite, once in place on the producing formation, can still dissolve with acid. Because of the oleophilic surface of graphite, it is likely that the graphite coated calcium carbonate will come out of the pores more easily than the uncoated mineral.

In some drill-in and completions, hydrophilic polymers such as XC-polymer (or xanthan gum), starch or hydroxyethylcellulose (collectively known as WSPs (Water Soluble Polymers)) may be used along with the calcium carbonate to give a very low APT fluid loss of less than 1-ml/30-min.

The life of the graphite coating can be controlled by varying the type and composition of binder. For short term life of about one hour or less, a water-soluble binder made from starch and hydroxyethylcellulose may be used. For a coating life of several hours, a binder made with a permeable film such as an acrylic emulsion may work best. For a long-lived coating with high resistance to water, a graphite-filled epoxy-based coating may be preferred. In each case, the likelihood of formation damage due to graphite content of the coating is minimal for two reasons: 1) the graphite is of extremely fine particle size (<10 micron), and 2) the weight percent graphite per particle can be down to the level of a minor contaminant.

EXAMPLE 1

Slip Plate No. 3 was sprayed onto various particulates while the contents were swirled and rolled in a plastic bowl to create laboratory-scale samples. A cake mixer also works. A coating was applied to ceramic, glass or plastic spheres and to various sized calcium carbonate particles in an amount ranging from trace graphite up to about a 15 mil (38.1 millimeters) coating. The thickness of the coating was calculated from an increase in weight and coating thickness based on the average particle size d50. For example, a ceramic sphere with an average particle size of 710 micron has a surface area of 0.0158 sq. cm. One particle will weigh 0.000497 g (assuming the ceramic proppants have a specific gravity of 2.65). Thus, from the weight of the sample before and after coating, one can roughly estimate the thickness of the coating. During the coating process, there was no evidence of permanent aggregate formation. Apparently spray coating and rolling the bowl until the solvent is released prevents the formation of aggregates, i.e., bond strength between particles is weak thus the aggregates break up into attractive, individual coated particles.

EXAMPLE 2

250 g of calcium carbonate (~50 micron) was coated with a water-based acrylic binder containing 33 wt % graphite. The graphite-coated calcium carbonate was ~90% dissolved in 15 HCl after being stirred for 20 minutes at 10,000 rpm. Additional samples of coated calcium carbonate and ceramic beads have been prepared with hand mixing, using polyurethane, ethylene vinyl acetate and polyvinyl acetate as the binder. The binder is preferably from 5-10 wt % relative to the coated particles and the graphite is from 5-15 wt % relative to the coated particles, and preferably from 7.3-12.5 wt. %.

Graphite Coated Substrates for Lost Circulation Control and Torque and Drag Reduction There is a strong belief in the oilfield that one must not have lost circulation while running pipe, cementing or conditioning the mud. Sized nut hulls have been used for many years to reduce or prevent lost circulation. They are typically manufactured from pecan shells, though black walnut shells are preferred because of higher strength. Nut hulls have been a preferred LC control material for the past 30 years because nut hulls are low cost and also work very well as seepage loss and lost circulation material.

Nut hulls used in the oilfield for lost circulation are available in three particle size ranges:

TABLE 2

|  | Resiliency, % | −30 Mesh | −60 Mesh |
| --- | --- | --- | --- |
| Coarse, % Through | 16 | 52 | 18 |
| Medium % Through | 12 | 28 | 10 |
| Fine % Through | 11 | 85 | 28 |

For purposes of Table 2, resiliency is determined by filling a compression test mold with 16 grams of dried material (nut hulls in this instance), compressing the material in an hydraulic press until the gauge needle reads zero, and measuring and recording the height of the mold. The material is compressed to 10,000 psi and the height is measured again. Pressure is released and the mold is removed from the press and allowed to expand until no more expansion is noticed. The height of the mold is measured. The final height minus the height at 10,000 psi divided by the height at 10,000 psi times 100 is the % resiliency.

EXAMPLE 3

A sample of fine nut hulls were coated with Slip Plate #3 and with 2ES-NT, an epoxy resin binder. Both binders contain about 30 wt % graphite. Graphite coated nut hulls wet easily in fresh water, brines, diesel oil and alcohol. The nut hulls coated with 2ES-NT remained intact after stirring in water for 24 hr. based on a visual inspection of the surface of particles at 10× microscopy. With graphite coating concentration ranging from 5 to 23 wt %, resiliency tests of graphite coated, nut hulls (fine) at 10,000 psi show a slight improvement in resiliency (2 to 4 points). A resilient material is one that expands back from a compacted state. Compaction of nut hulls under high pressure suggests that they behave more as an elastic solid (by bending and flattening) than a resilient solid. The process appears to do a good job of coating all three sizes of nut hulls.

Graphite Coated Glass, Plastic and Ceramic Beads.

Theory suggests that blends of LCMs are the best way to improve lost return problems because of two mechanisms: (1) the formation of a strong, trellis-like structure inside a loss zone and (2) the mechanical and physical properties of the materials themselves.

Drill-string torque of water-based drilling fluids typically have coefficient of friction factors of 0.22 to 0.27. These values become more significant in horizontal holes. In addition, solids-free, drill-in and completion fluids typically show a high friction factor. Graphite-coated particulates, especially coated beads, would reduce casing wear and perhaps tortuosity of the drill string while the drill pipe is being pushed and the bit is rotating on the bottom of the hole.

EXAMPLE 4

Glass beads were obtained from Swarco America Inc. of Columbia, Tenn., in three sizes, Coarse, Medium and Fine. Seven samples were coated with graphite wt % as shown below. Other manufacturers of glass, plastic and ceramic beads offer similar choices and were similarly coated with graphite.

TABLE 3

| | Sizing (Mesh) | Wt. % graphite (air dried to constant weight) | | |
|---|---|---|---|---|
| Coarse | (−14/+20) | 0.168 | 5.03 | 10.6 |
| Medium | (−20/+40) | 0.493 | 3.40 | |
| Fine | (−175/+325) | 2.81 | 3.52 | |

Five, 200 g samples of medium size Swarco glass beads were coated with Slip Plate No. 3 in concentrations of 2.5, 4.5, 9.5, 22.5 (wt) % dry basis. An advantage of graphite coated beads of glass, plastic or ceramic is that the beads are available in narrow particle size ranges for optimum strength and torque and drag reduction.

Aggregation of several beads into a single large particle coated with graphite should not be a problem since a graphite to graphite surface has weak binding forces. Graphite is very soft along the {0001} plane. Hence aggregation of beads is not a serious problem, providing the ratio of binder to graphite and the method of coating is optimized. In fact, mixtures of various particle sizes of spherical beads can be used as a lost circulation material providing calculations are made for optimum packing density.

Flake graphite, Grade 8624 (90 wt. % passing through 200 mesh) available from Superior Graphite Co. was used to coat 70 mesh ceramic beads. The flake graphite was slowly poured into a glass bottle containing the starch dispersion. Mixing with a spatula was followed by fairly high speed mixing with a ½ HP, 3-bladed propeller mixer until the beads were well coated with graphite and largely de-aggregated. The 200-g batch was dumped on butcher paper and allowed to dry at 135° F.

Ceramic beads are used in the foundry industry as synthetic sand, as proppants for well stimulation and as torque and drag reducers in drilling fluids. The main problem with ceramic beads for use in drilling fluids is their abrasivity. A graphite coating as described above solves that problem.

Graphite Coated Perlite for Seepage Loss Reduction

EXAMPLE 5

Seepage loss test results with 30 lb/bbl of perlite coated graphite vs. an equal weight of sized, resilient graphitic particles, Grade 9019, a recognized LCM product from Superior Graphite Co., in a 12 lb/gal seawater PHPA mud was excellent. There was no detectable difference in sealing performance between the perlite coated graphite sample and the LCM made of sized, resilient graphitic particles.

Another property imparted to perlite with a graphite coating is that it scavenges oil from mud and water. The oil coated graphite coating the particles can be designed to float to the surface for easy removal.

Thus, oil field particulates have been disclosed having an anti-friction coating. While the invention has been described in terms of certain specific embodiments, there is no intent to limit it to the same. For example, oil field particulates in addition to those specifically identified in Table 1 may be advantageously coated in accordance with the present invention. Further, while coated particulates according to the present invention may have particular utility in the oilfield, other fields of use, such as metallurgy, are also contemplated. Thus, the invention is defined by the following claims.

What is claimed is:

1. A method of coating a particulate with a friction reducing coating comprising:

providing a particulate selected from the group consisting of gravel-packed sand, granular bentonite, ground Gilsonite, calcium carbonate, glass beads, rock wool, shredded paper, metal spheres, ceramic beads, nut hulls, ground rubber, plastic beads, muscovite mica, calcined petroleum coke and perlite;

providing graphite particles;

providing a binder;

mixing the graphite particles in the binder; and mixing the particulates with the mixture of the binder and graphite particles.

2. The method of claim 1 wherein the coated particles have a mean particle size of from between 20μ and 6.3 mm.

3. The method of claim 1 wherein the graphite particles have a mean particle size of from 0.001μ to 850μ.

4. The method of claim 1 wherein the mixture of the binder and graphite particles is mixed with the particulates at least two times.

5. The method of claim 1 wherein the weight percent of the graphite particles relative to the binder is between 5 wt % and 95 wt %.

6. The method of claim 1 wherein the graphite is selected from natural flake, synthetic and amorphous graphite.

7. The method of claim 1 wherein the binder comprises one or more of a natural, synthetic, water soluble and organic resin.

8. The method of claim 1 wherein the binder comprises a film-forming water soluble polymer.

9. The method of claim 1 wherein the binders selected from one or more of a starch, carboxymethyl cellulose, hydroxyethyl cellulose, and xanthan gum.

10. The method of claim 1 wherein the binder comprises an organic film-forming resin.

11. The method of claim 10 wherein the organic film-forming resin in one or more of an alkyd, polyurethane and epoxy.

12. The method of claim 1 wherein the binder comprises a resin-dispersed emulsion.

13. The method of claim 12 wherein the resin-dispersed emulsion is one or more of a latex or an acrylic.

14. A method of coating a particulate with a friction reducing coating comprising providing a particulate selected from the group consisting of gravel-packed sand, granular bentonite, ground Gilsonite, calcium carbonate, glass beads, rock wool, shredded paper, metal spheres, ceramic beads, nut hulls, ground rubber, plastic beads, muscovite mica, calcined petroleum coke and perlite;

providing a binder;

mixing the particulates and the binder;

providing additional binder and graphite particles;

mixing the additional binder and the graphite particles; and mixing the binder-coated particulates with the mixture of the additional binder and the graphite particles.

15. The method of claim 14 wherein the graphite is selected from natural flake, synthetic and amorphous graphite.

16. The method of claim 14 wherein the binder comprises an organic film-forming resin.

17. The method of claim 14 wherein the binder comprises a film-forming water soluble polymer.

18. The method of claim 14 wherein the binder comprises one or more of a natural, synthetic, water soluble and organic resin.

* * * * *